(12) United States Patent
Su et al.

(10) Patent No.: US 10,367,635 B2
(45) Date of Patent: Jul. 30, 2019

(54) SIGNAL TRANSMISSION APPARATUS, CARRIER PHASE RECOVERY APPARATUS AND METHOD

(71) Applicant: Fujitsu Limited, Kawasaki-shi, Kanagawa (JP)

(72) Inventors: Xiaofei Su, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/443,322

(22) Filed: Feb. 27, 2017

(65) Prior Publication Data

US 2017/0250792 A1 Aug. 31, 2017

(30) Foreign Application Priority Data

Feb. 29, 2016 (CN) .......................... 2016 1 0112351

(51) Int. Cl.
*H04L 7/00* (2006.01)
*H04B 10/54* (2013.01)
*H04B 10/61* (2013.01)
*H04L 27/34* (2006.01)
*H04L 27/36* (2006.01)
*H04L 27/38* (2006.01)
*H04B 10/548* (2013.01)
*H04B 10/556* (2013.01)

(52) U.S. Cl.
CPC ......... *H04L 7/0075* (2013.01); *H04B 10/541* (2013.01); *H04B 10/548* (2013.01); *H04B 10/5561* (2013.01); *H04B 10/6165* (2013.01); *H04L 27/3405* (2013.01); *H04L 27/361* (2013.01); *H04L 27/3827* (2013.01)

(58) Field of Classification Search
CPC ...................... H04B 10/5161; H04B 10/5051
See application file for complete search history.

(56) References Cited

U.S. PATENT DOCUMENTS

| | | | | |
|---|---|---|---|---|
| 7,583,749 B2 * | 9/2009 | Kasai | ........................ | H04L 5/14 324/202 |
| 8,582,976 B2 * | 11/2013 | Boyd | ..................... | H04B 10/58 398/158 |
| 9,331,788 B2 * | 5/2016 | Abe | ....................... | H04B 10/50 |
| 9,614,638 B2 * | 4/2017 | Kim | ..................... | H04J 14/0221 |
| 9,735,879 B2 * | 8/2017 | Doany | ................. | H04B 10/508 |
| 2003/0025957 A1 * | 2/2003 | Jayakumar | ............. | H04B 10/00 398/5 |

(Continued)

*Primary Examiner* — Mina M Shalaby
(74) *Attorney, Agent, or Firm* — Staas & Halsey LLP

(57) ABSTRACT

Embodiments of this disclosure provide a signal transmission apparatus, a carrier phase recovery apparatus and method. By inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

6 Claims, 11 Drawing Sheets

(56) References Cited

U.S. PATENT DOCUMENTS

| | | | | |
|---|---|---|---|---|
| 2007/0098412 A1* | 5/2007 | Scoggins | ............. | H04B 10/504 398/182 |
| 2008/0056727 A1* | 3/2008 | Nishihara | ............ | H04B 10/505 398/155 |
| 2008/0212976 A1* | 9/2008 | Asano | ................. | H04B 10/505 398/161 |
| 2010/0098436 A1* | 4/2010 | Mahgerefteh | .... | H04B 10/25137 398/192 |
| 2011/0225341 A1* | 9/2011 | Satoh | .................... | G06F 13/405 710/314 |
| 2012/0106969 A1* | 5/2012 | Ogiwara | .......... | H04B 10/07957 398/79 |
| 2013/0266313 A1* | 10/2013 | Shen | ................. | H04B 10/0775 398/34 |
| 2017/0250792 A1* | 8/2017 | Su | ........................ | H04B 10/548 |

* cited by examiner

SIGNAL TRANSMISSION APPARATUS, CARRIER PHASE RECOVERY APPARATUS AND METHOD

CROSS-REFERENCE TO RELATED APPLICATIONS

This application claims the benefit of Chinese Application No. 201610112351.0, filed Feb. 29, 2016, in the Chinese Intellectual Property Office, the disclosure of which is incorporated herein by reference.

TECHNICAL FIELD

This disclosure relates to the field of communications, and in particular to a signal transmission apparatus, a carrier phase recovery apparatus and method.

BACKGROUND

Optical communications systems occupy an important position in communications transmission networks for their huge transmission bandwidths, huge capacity expansion potentials, very low transmission loss and low costs. As the development of high-speed digital-to-analog conversion (DAC) chips, analog-to-digital conversion (ADC) chips and digital signal processing (DSP) chips, the digital coherent optical communications technology becomes a main stream tendency in next generation communications.

In order to construct an optical communications network of low cost, large capacity and high spectral efficiency, it is crucial to select a suitable modulation format. As a most efficient way, a flexible variable modulation format becomes a focused hot spot. However, a complex modulation format is particularly sensitive to a laser phase noise, which results in a severe bit error, thereby greatly limiting a transmission efficiency of the system. Hence, in a typical digital coherent receiver, it is an indispensable operation to perform carrier phase recovery on received signals. Furthermore, in practical application, it is often expected to use a non-feedback blind phase estimation method, to avoid transmission costs caused by feedback delay and training sequences, thereby improving an information transmission efficiency.

In conventional carrier phase recovery (CPR) methods, a commonly-used method is a Viterbi-Viterbi algorithm. A principle of such a method is to remove information on modulation phase items after a biquadratic operation is performed on received signals, to obtain information containing a noise item only, and then its angle is taken and divided by four, to obtain a phase noise estimation value. Another commonly-used method is a blind phase search (BPS) algorithm. A basic principle of such a method is to rotate a received complex signal by n test angles, and then calculate offset distances between the signal and its judgment position in turn, to obtain a minimum offset distance through comparison.

It should be noted that the above description of the background is merely provided for clear and complete explanation of this disclosure and for easy understanding by those skilled in the art. And it should not be understood that the above technical solution is known to those skilled in the art as it is described in the background of the this disclosure.

SUMMARY

However, the above Viterbi-Viterbi algorithm is only applicable to a constant modulus modulation signal, such as quadrature phase shift keying (QPSK), which is inapplicable to a high-order quadrature amplitude modulation (QAM) signal directly. Although the blind phase search algorithm is applicable to multiple modulation formats, its calculation complexity is high, and is hard to be achieved in hardware.

Embodiments of the this disclosure provide a signal transmission apparatus, a carrier phase recovery apparatus and method, which are applicable to communications systems of various modulation formats and are compatible with existing communications systems, and calculation complexity is relatively low. Furthermore, phase modulation signals may be flexibly configured in data modulation signals, to lower redundancy and influence on the system capacity is relatively small.

According to a first aspect of the embodiments of the this disclosure, there is provided a signal transmission apparatus, including: an inserting unit configured to insert at least one phase modulation signal with at least one variable amplitude into data modulation signals, to perform carrier phase recovery at a receiving end; and a transmitting unit configured to transmit transmission signals formed after the phase modulation signal is inserted into the data modulation signals.

According to a second aspect of the embodiments of the this disclosure, there is provided a carrier phase recovery apparatus, including: an extracting unit configured to extract phase modulation signals in received signals; wherein, the phase modulation signals are phase modulation signals with variable amplitudes inserted into data modulation signals transmitted at a transmitting end; an estimating unit configured to estimate phase noises of the received signals according to the phase modulation signals in the received signals; and a compensating unit configured to perform phase compensation on the received signals according to the phase noises of the received signals.

According to a third aspect of the embodiments of this disclosure, there is provided a transmitter, including the signal transmission apparatus as described in the first aspect of the embodiments of this disclosure.

According to a fourth aspect of the embodiments of this disclosure, there is provided a receiver, including the carrier phase recovery apparatus as described in the second aspect of the embodiments of this disclosure.

According to a fifth aspect of the embodiments of the this disclosure, there is provided a signal transmission method, including: inserting at least one phase modulation signal with at least one variable amplitude into data modulation signals, to perform carrier phase recovery at a receiving end; and transmitting transmission signals formed after the phase modulation signal is inserted into the data modulation signals.

According to a sixth aspect of the embodiments of the this disclosure, there is provided a carrier phase recovery method, including: extracting phase modulation signals in received signals; wherein, the phase modulation signals are phase modulation signals with variable amplitudes inserted into data modulation signals transmitted at a transmitting end; estimating phase noises of the received signals according to the phase modulation signals in the received signals; and performing phase compensation on the received signals according to the phase noises of the received signals.

An advantage of the embodiments of the this disclosure exists in that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

The signal transmission apparatus, carrier phase recovery apparatus and method provided by the embodiments of this disclosure may be applicable to all communications systems in which phase noises exist. In the embodiments of this disclosure, description shall be given taking an optical communications system as an example; however, the embodiments of this disclosure are not limited thereto.

Embodiment 1

Figure 1:
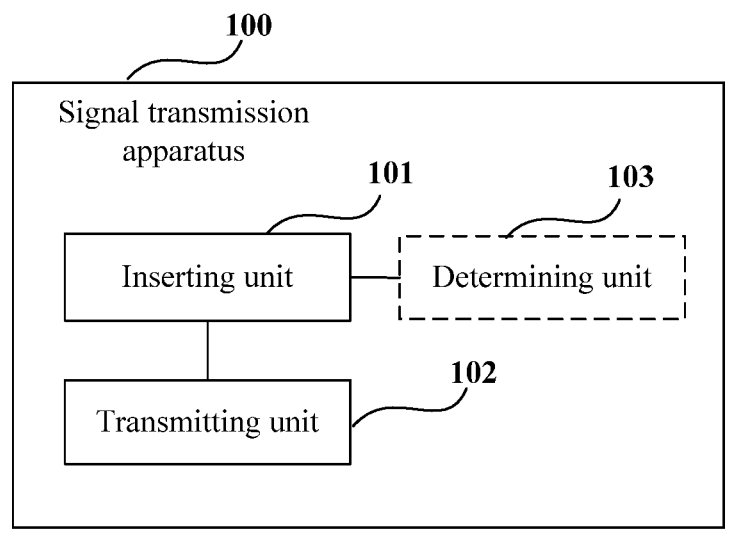
FIG. 1 is a schematic diagram of the signal transmission apparatus of Embodiment 1 of this disclosure.

FIG. 1 is a schematic diagram of the signal transmission apparatus of Embodiment 1 of this disclosure. As shown in FIG. 1, the apparatus 100 includes:

an inserting unit 101 configured to insert at least one phase modulation signal with at least one variable amplitude into data modulation signals, so as to perform carrier phase recovery at a receiving end; and a transmitting unit 102 configured to transmit transmission signals formed after the phase modulation signal is inserted into the data modulation signals.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

In this embodiment, the inserting unit 101 inserts at least one phase modulation signal with at least one variable amplitude into the data modulation signals. For example, the data modulation signals may be data modulation signals of arbitrary formats, such as non-constant modulus modulated 32QAM and 64QAM signals.

In this embodiment, the data modulation signals may contain signals of multiple modulation formats. For example, the data modulation signals contain signals of multiple modulation formats, such as 16QAM, 32QAM and 64QAM. Furthermore, the data modulation signals may contain specific training sequences, and may also not contain a specific training sequence.

In this embodiment, the number of the inserted phase modulation signals may be 1 or more, and may be set according to an actual situation. In this embodiment, description shall be given taking that a number of phase modulation signals are inserted as an example.

In this embodiment, positions of the phase modulation signals inserted into the data modulation signals and a manner of insertion may be set according to an actual situation. For example, the phase modulation signals may be inserted into the data modulation signals by the inserting unit 101 in a consecutive or spaced manner in a time domain.

Figure 2:
FIG. 2 is a schematic diagram of a frame structure of transmission signals of Embodiment 1 of this disclosure.

FIG. 2 is a schematic diagram of a frame structure of transmission signals of Embodiment 1 of this disclosure. As shown in FIG. 2, data A denote data modulation signals, data B denote phase modulation signals, and a number of phase modulation signals are inserted in a spaced manner in the time domain.

Figure 3:
FIG. 3 is another schematic diagram of the frame structure of transmission signals of Embodiment 1 of this disclosure.

FIG. 3 is another schematic diagram of the frame structure of the transmission signals of Embodiment 1 of this disclosure. As shown in FIG. 3, data A denote data modulation signals, data B denote phase modulation signals, and a number of phase modulation signals are consecutively inserted in the time domain.

In this embodiment, lengths of the data A and data B in FIG. 2 and FIG. 3 may be arbitrarily set according to an actual situation. A proportion of the data B, i.e. the phase modulation signals, in the transmission signals, may be variable, and may be set according to an actual situation.

In this embodiment, the amplitudes of the phase modulation signals are variable. For example, in the data modulation signals, the phase modulation signals may include a number of phase modulation signals of different amplitudes, or may include a number of phase modulation signals of identical amplitudes, such as QPSK signals.

In this embodiment, when the phase modulation signals are multiple, a phase difference between any two phase modulation signals may be set to be $$\frac{m\pi}{n};$$

where, m and n are non-zero integers. For example, the phase difference between two neighboring phase modulation signals in frequency is set to be $\pi/2$.

In this embodiment, the constellation points of the inserted phase modulation signals may coincide with specific constellation points in a constellation diagram of the data modulation signals. In this way, it is facilitated to achieve by using hardware of an existing transmitter, compatibility with existing systems may further be improved and calculation complexity may be lowered.

Structures of the phase modulation signals inserted into the data modulation signals shall be illustrated below taking a number of phase modulation signals of identical amplitudes, i.e. QPSK signals, as examples.

Figure 4:
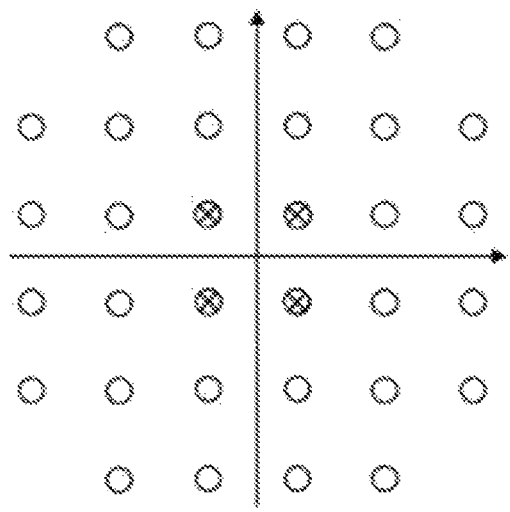
FIG. 4 is a first schematic diagram of a constellation diagram of transmission signals of Embodiment 1 of this disclosure.
Figure 5:
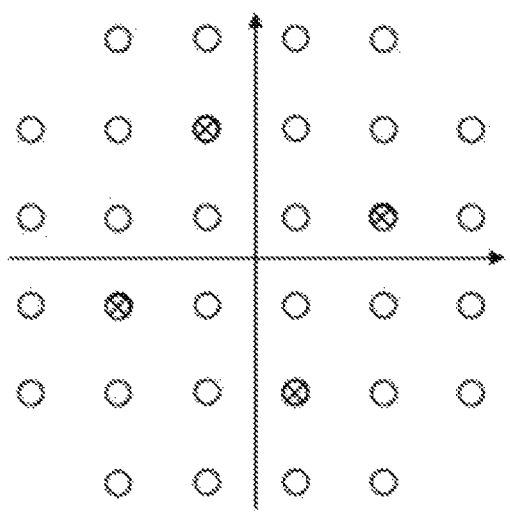
FIG. 5 is a second schematic diagram of a constellation diagram of transmission signals of Embodiment 1 of this disclosure.
Figure 6:
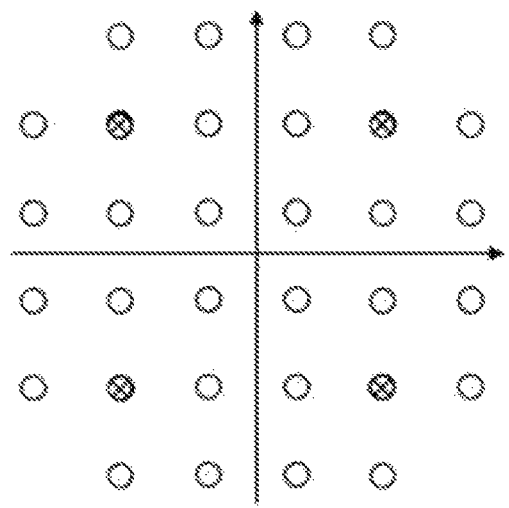
FIG. 6 is a third schematic diagram of a constellation diagram of transmission signals of Embodiment 1 of this disclosure.
Figure 7:
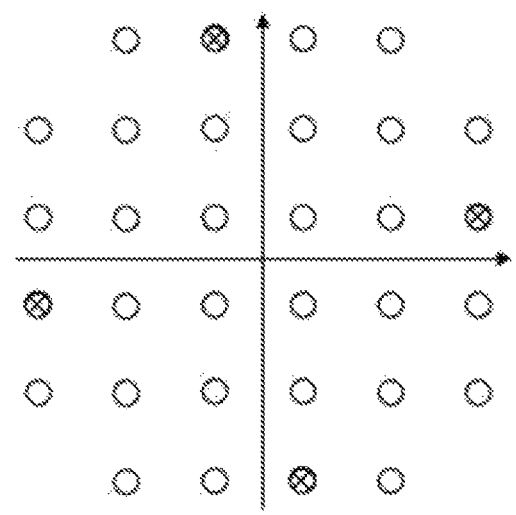
FIG. 7 is a fourth schematic diagram of a constellation diagram of transmission signals of Embodiment 1 of this disclosure.
Figure 8:
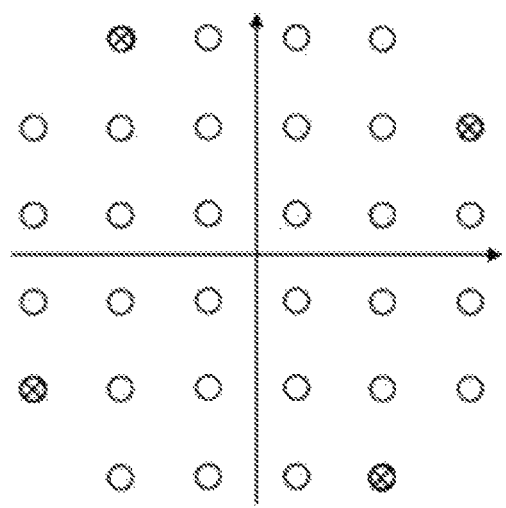
FIG. 8 is a fifth schematic diagram of a constellation diagram of transmission signals of Embodiment 1 of this disclosure.

FIG. 4 is a first schematic diagram of a constellation diagram of the transmission signals of Embodiment 1 of this disclosure, FIG. 5 is a second schematic diagram of the constellation diagram of the transmission signals of Embodiment 1 of this disclosure, FIG. 6 is a third schematic diagram of the constellation diagram of the transmission signals of Embodiment 1 of this disclosure, FIG. 7 is a fourth schematic diagram of the constellation diagram of the transmission signals of Embodiment 1 of this disclosure, and FIG. 8 is a fifth schematic diagram of the constellation diagram of the transmission signals of Embodiment 1 of this disclosure. As shown in FIGS. 4-8, ○ denotes the data modulation signals, ⊗ denotes the phase modulation signals inserted into the data modulation signals, the data modulation signals being 32QAM signals, and the inserted phase modulation signals being located on constellation points of a specific circle of the constellation diagram.

As shown in FIG. 4, the inserted phase modulation signals are located on constellation points of an innermost circle of the constellation diagram of the 32QAM signals, as shown in FIG. 5, the inserted phase modulation signals are located on constellation points of a second circle of the constellation diagram of the 32QAM signals, as shown in FIG. 6, the inserted phase modulation signals are located on constellation points of a third circle of the constellation diagram of the 32QAM signals, as shown in FIG. 7, the inserted phase modulation signals are located on constellation points of a fourth circle of the constellation diagram of the 32QAM signals, and as shown in FIG. 8, the inserted phase modulation signals are located on constellation points of an outermost circle of the constellation diagram of the 32QAM signals; wherein, the phase difference between neighboring phase modulation signals is $\pi/2$.

Structures of the phase modulation signals inserted into the data modulation signals shall be illustrated below taking a number of phase modulation signals of different amplitudes as examples.

Figure 9:
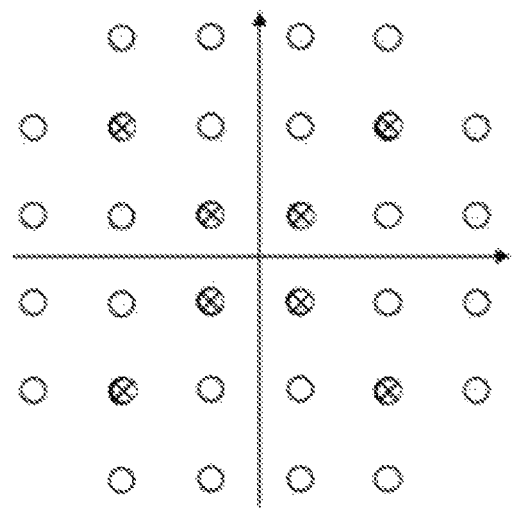
FIG. 9 is a sixth schematic diagram of a constellation diagram of transmission signals of Embodiment 1 of this disclosure.
Figure 10:
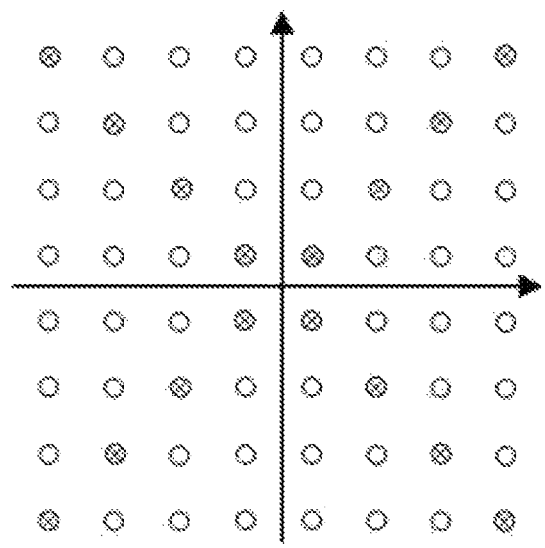
FIG. 10 is a seventh schematic diagram of a constellation diagram of transmission signals of Embodiment 1 of this disclosure.
Figure 11:
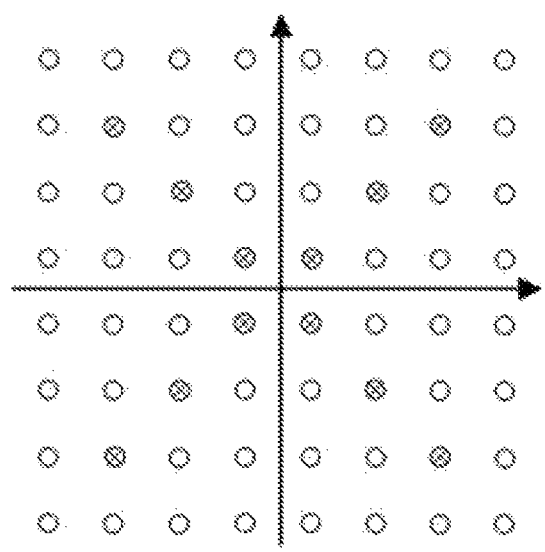
FIG. 11 is an eighth schematic diagram of a constellation diagram of transmission signals of Embodiment 1 of this disclosure.

FIG. 9 is a sixth schematic diagram of the constellation diagram of the transmission signals of Embodiment 1 of this disclosure, FIG. 10 is a seventh schematic diagram of the constellation diagram of the transmission signals of Embodiment 1 of this disclosure, and FIG. 11 is an eighth schematic diagram of the constellation diagram of the transmission signals of Embodiment 1 of this disclosure. As shown in FIGS. 9-11, ○ denotes the data modulation signals, ⊗ denotes the phase modulation signals inserted into the data modulation signals, the inserted phase modulation signals being located on constellation points of intersecting lines of $\pi/4$ and $3\pi/4$ of the constellation diagram.

As shown in FIG. 9, the data modulation signals are 32QAM signals, and the inserted phase modulation signals are located on constellation points of an innermost and third circles of the constellation diagram of the 32QAM signals, that is, being located on constellation points of intersecting lines of π/4 and 3π/4 of the 32QAM constellation diagram; as shown in FIG. 10, the data modulation signals are 64QAM signals, and the inserted phase modulation signals are located on constellation points of a first, third, fifth and seventh circles of the constellation diagram of the 64QAM signals, that is, being located on constellation points of intersecting lines of π/4 and 3π/4 of the 64QAM constellation diagram; and as shown in FIG. 11, the data modulation signals are 64QAM signals, and the inserted phase modulation signals are located on constellation points of a first, third and fifth circles of the constellation diagram of the 64QAM signals, that is, being located on constellation points of intersecting lines of π/4 and 3π/4 of the 64QAM constellation diagram.

The method of insertion of the phase modulation signals of this embodiment is illustrated above. However, the constellation points of the inserted phase modulation signals may not coincide with the constellation points in the constellation diagram of the data modulation signals. For example, the phase modulation signals are set so that they are offset from specific constellation points by a certain angle.

In this embodiment, the transmitting unit 102 transmits the transmission signals formed after the phase modulation signals are inserted into the data modulation signals, and an existing signal transmission method may be used for transmission.

In this embodiment, the signal transmission apparatus 100 further includes: a determining unit 103 configured to determine positions of the phase modulation signals in the constellation diagram of the data modulation signals, so that a bit error rate of the receiving end is minimum when the phase modulation signals are at said positions. In this embodiment, the determining unit 103 is optional, and is shown by dotted lines in FIG. 1.

For example, it is assumed that a format of the data modulation signals is 32QAM, and a phase modulation signal is inserted into each k data modulation signals (QAM symbols) in the time domain, k being a positive integer; wherein, taking a Q value as a criterion for measurement, carrier phase recovery performances of different QPSK power are obtained through simulation by using such software as MATLAB, etc., which may represent bit error rates of the receiving end, different QPSK power denotes different insertion positions of QPSK.

Figure 12:
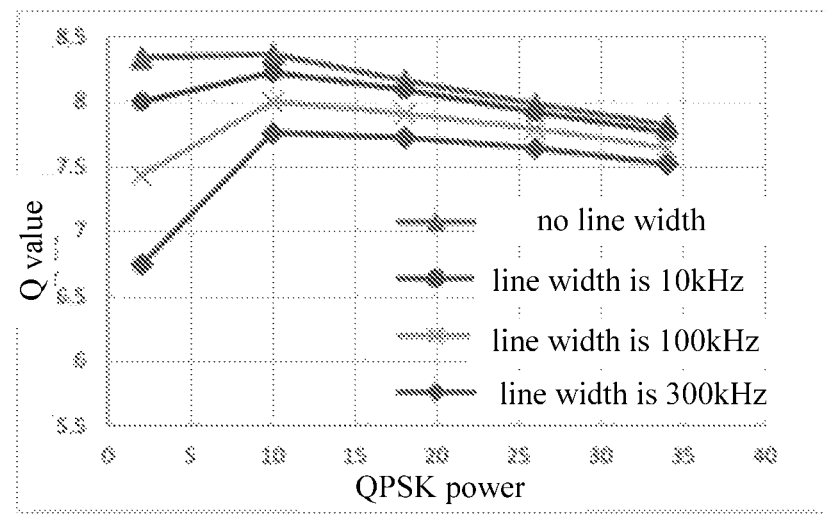
FIG. 12 is a schematic diagram of performances of carrier phase recovery at different power of Embodiment 1 of this disclosure.

FIG. 12 is a schematic diagram of performances of carrier phase recovery at different power of Embodiment 1 of this disclosure. As shown in FIG. 12, assuming that k is 8, that is, a phase modulation signal is inserted into each 8 QAM symbols in the time domain, and a minimum unit in the constellation diagram is normalized into 1, a mean power of the 32QAM signals is 20, the power of the five kinds of phase modulation signals (QPSK symbols) shown in FIGS. 4-8 is 2, 10, 18, 26 and 34 in turn, and a calculation result of optimal power in case of no line width is 10, and when line widths of lasers are 10 kHz, 100 kHz and 300 kHz, optimal QPSK power is still 10, that is, positions of the constellation points of QPSK power of 10 shown in FIG. 5 are determined as positions of the phase modulation signals in the constellation diagram.

Figure 13:
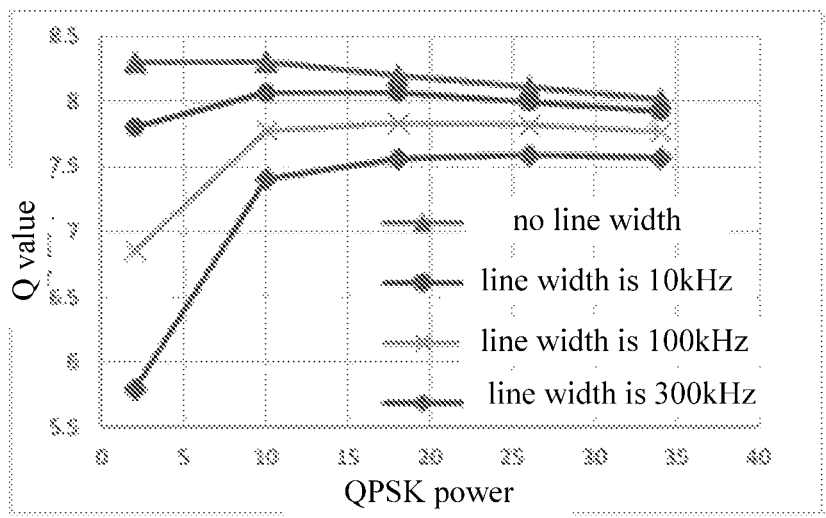
FIG. 13 is another schematic diagram of performances of carrier phase recovery at different power of Embodiment 1 of this disclosure.

FIG. 13 is another schematic diagram of performances of carrier phase recovery at different power of Embodiment 1 of this disclosure. As shown in FIG. 13, assuming that k is 16, that is, a phase modulation signal is inserted into each 16 QAM symbols, and a minimum unit in the constellation diagram is normalized into 1, a mean power of the 32QAM signals is 20, the power of the five phase modulation signals (QPSK symbols) shown in FIGS. 4-8 is 2, 10, 18, 26 and 34 in turn, and a calculation result of optimal power in case of no wire width is 10, and when line widths of lasers are 10 kHz, 100 kHz and 300 kHz, optimal QPSK power is 10, 18 and 26 respectively, that is, positions of the constellation points of QPSK power of 10, 18 or 26 shown respectively in FIGS. 4, 5 and 6 are determined as positions of the phase modulation signals in the constellation diagram.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Furthermore, the constellation points of the inserted phase modulation signals may coincide with the specific constellation points in the constellation diagrams of the data modulation signals. In this way, it is facilitated to achieve by using hardware of an existing transmitter, compatibility with existing communications systems may further be improved and calculation complexity may be lowered.

Embodiment 2

Figure 14:
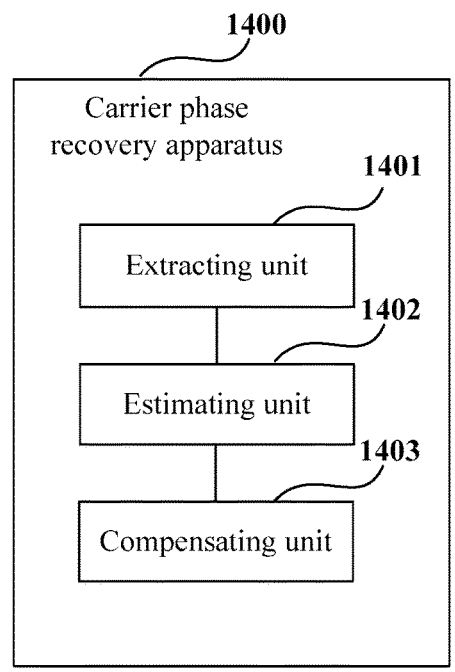
FIG. 14 is a schematic diagram of the carrier phase recovery apparatus of Embodiment 2 of this disclosure.

An embodiment of this disclosure further provides a carrier phase recovery apparatus. FIG. 14 is a schematic diagram of the carrier phase recovery apparatus of Embodiment 2 of this disclosure. As shown in FIG. 14, the apparatus 1400 includes:

an extracting unit 1401 configured to extract phase modulation signals in received signals; wherein, the phase modulation signals are phase modulation signals with variable amplitudes inserted into data modulation signals transmitted at a transmitting end;

an estimating unit 1402 configured to estimate phase noises of the received signals according to the phase modulation signals in the received signals; and a compensating unit 1403 configured to perform phase compensation on the received signals according to the phase noises of the received signals.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, so as to lower redundancy and influence on the system capacity is relatively small.

In this embodiment, the extracting unit 1401 extracts the phase modulation signals in the received signals, the received signals being signals received at the receiving end after the signals transmitted by the signal transmission apparatus described in Embodiment 1 pass through a transmission link. In this embodiment, the extracting unit 1401 may extract the phase modulation signals by using an existing method.

Figure 15:
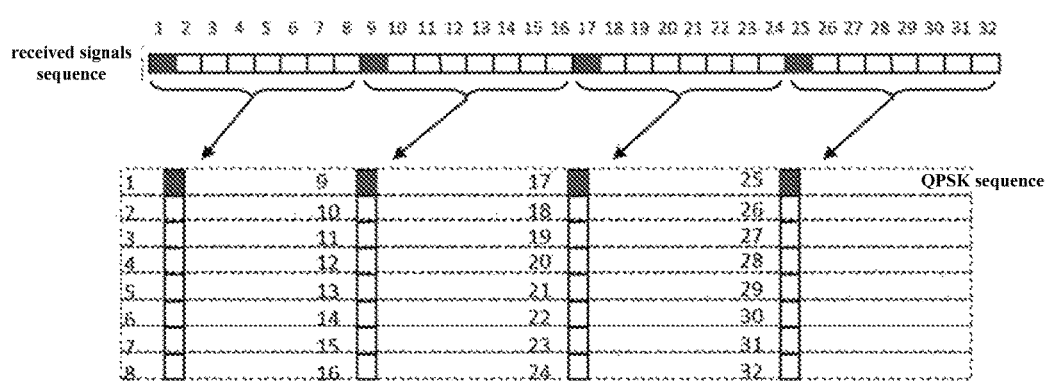
FIG. 15 is a schematic diagram of extracting phase modulation signals from received signals of Embodiment 2 of this disclosure.

For example, FIG. 15 is a schematic diagram of extracting the phase modulation signals from the received signals of Embodiment 2 of this disclosure. As shown in FIG. 15, it is assumed that there exist one phase modulation signal (such as a QPSK symbol) and seven consecutive data modulation signals (such as QAM symbols) in each eight received symbols in the time domain. As mean values of modulus values of QPSK symbols and QAM symbols are different, it may be directly judged whether a current symbol is a QPSK symbol or a QAM symbol by calculating mean values of modulus values in a period of time.

In this embodiment, after the extracting unit 1401 extracts the phase modulation signals in the received signals, the estimating unit 1402 estimates the phase noises of the received signals according to the phase modulation signals in the received signals.

A structure of the estimating unit 1402 and a method for estimating the phase modulation signals in the received signals of this embodiment shall be illustrated below.

Figure 16:
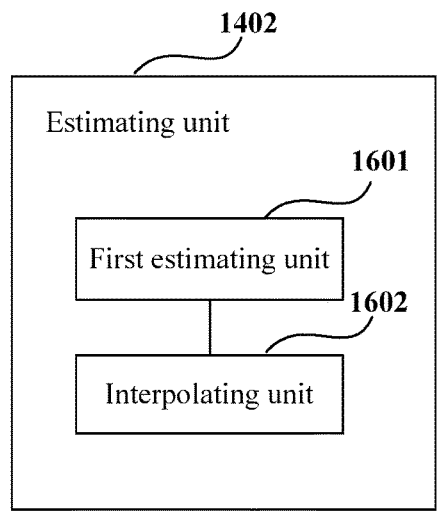
FIG. 16 is a schematic diagram of an estimating unit of Embodiment 2 of this disclosure.

FIG. 16 is a schematic diagram of the estimating unit 1402 of Embodiment 2 of this disclosure. As shown in FIG. 16, the estimating unit 1402 includes:

a first estimating unit 1601 configured to estimate phase noises of the phase modulation signals; and an interpolating unit 1602 configured to perform interpolation processing on the phase noises of the phase modulation signals, to obtain the phase noise of the received signals.

In this embodiment, the first estimating unit 1601 may estimate the phase noise of the phase modulation signals by using an existing method. For example, the phase noise estimation is performed by using a Viterbi-Viterbi algorithm.

It is assumed that the received signals may be expressed by formula (1) below:

$$I = A \cdot \exp(j(\theta_{signal} + \theta_{noise})) \quad (1);$$

where, A denotes an amplitude of the received signals, $\theta_{signal}$ and $\theta_{noise}$ respectively denotes a modulation phase and a noise phase.

A biquadratic operation is performed on formula (1), and formula (2) below is obtained:

$$I^4 = A^4 \cdot \exp(j(4\theta_{signal} + 4\theta_{noise})) \quad (2);$$

For the phase modulation signals shown in FIGS. 4-11, phase spacing of $\pi/2$ exists between constellation points where neighboring phase modulation signals are located, the modulation phase is $$\theta_{signal} = n \cdot \frac{\pi}{4}, n = 1, 3, 5, 7,$$

so that $\exp(j4\theta_{signal}) = -1$, and phase information on the modulation signals may be removed.

By calculating a mean phase noise of data blocks of a length of N, an estimated value of $\varphi$ of a phase noise of an i-th symbol is obtained, which may be expressed by formula (3) below:

$$\varphi_i = \frac{1}{4} \arg\left( \sum_{i-ceil(N/2)+1}^{i+floor(N/2)} (I_i)^4 \right); \quad (3)$$

where, $\varphi_i$ denotes the estimated value of the phase noise of the i-th symbol, arg( ) is an angle taking operation, ceil( ) is up rounding, and floor( ) is down rounding.

In this embodiment, for the phase modulation signals in FIGS. 4, 6, 9, 10 and 11, the phase noises may be estimated by directly using the above Viterbi-Viterbi algorithm, while for the three kinds of phase modulation signals of a single amplitude in FIGS. 5, 7 and 8, input signals I need to be rotated by corresponding angles before the Viterbi-Viterbi algorithm is used, the rotated angles being arctan(⅕), arctan (⅕) and arctan(⅗), respectively.

In this embodiment, the interpolating unit 1602 may perform interpolation processing on the phase noise of the phase modulation signals by using an existing method, such as a constant interpolation method, a linear interpolation method, or a cubic spline interpolation method, etc.

Figure 17:
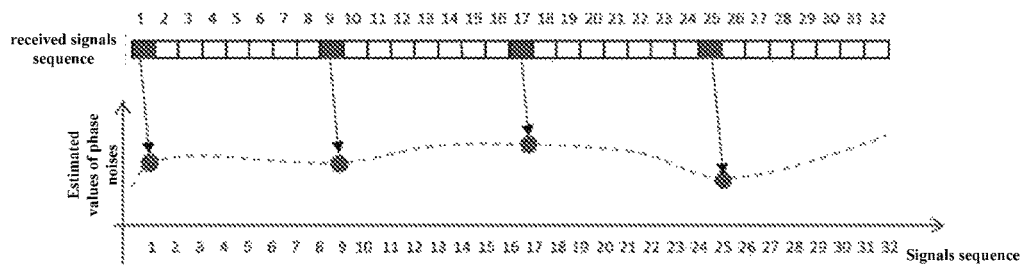
FIG. 17 is a schematic diagram of performing interpolation processing on phase noises of the phase modulation signals of Embodiment 2 of this disclosure.

FIG. 17 is a schematic diagram of performing interpolation processing on the phase noises of the phase modulation signals of Embodiment 2 of this disclosure. As shown in FIG. 17, it is assumed that there exists a phase modulation signal (such as a QPSK symbol) and 7 consecutive data modulation signals (such as QAM symbols) in each 8 received symbols, and it is known that QPSK symbols are located at symbol positions 1, 9, 17 and 25, estimated phase values of four groups of QAM symbols are obtained through interpolation calculation according to the calculated corresponding four estimated values of phase noises, thereby completing the phase noise estimation of the received signals.

In this embodiment, after the phase noises of the received signals are estimated, the compensating unit 1403 performs phase compensation on the received signals according to the phase noise of the received signals.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Embodiment 3

Figure 18:
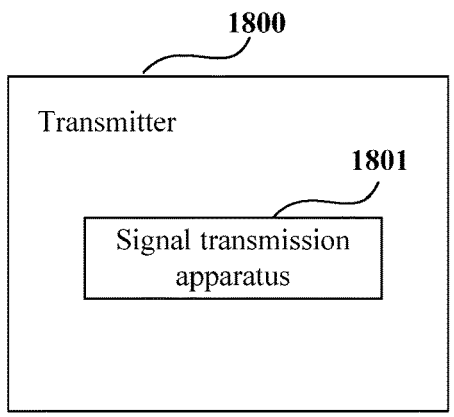
FIG. 18 is a schematic diagram of the transmitter of Embodiment 3 of this disclosure.

An embodiment of this disclosure further provides a transmitter. FIG. 18 is a schematic diagram of the transmitter of Embodiment 3 of this disclosure. As shown in FIG. 18, the transmitter 1800 includes a signal transmission apparatus 1801, a structure and functions of the signal transmission apparatus 1801 being identical to those of Embodiment 1, and being not going to be described herein any further.

Figure 19:
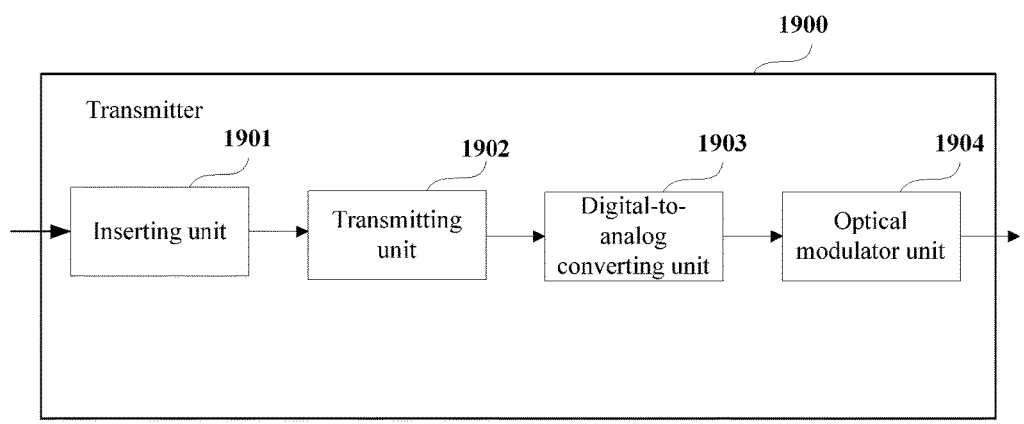
FIG. 19 is a block diagram of a systematic structure of the transmitter of Embodiment 3 of this disclosure.

FIG. 19 is a block diagram of a systematic structure of the transmitter of Embodiment 3 of this disclosure. As shown in FIG. 19, the transmitter 1900 includes an inserting unit 1901, a transmitting unit 1902, a digital-to-analog converting unit 1903 and an optical modulator unit 1904; wherein, the inserting unit 1901 inserts at least one phase modulation signal with at least one variable amplitude into data modulation signals, to perform carrier phase recovery at a receiving end, the transmitting unit 1902 transmits transmission signals formed after the phase modulation signal is inserted into the data modulation signals, the transmission signals being digital signals, and structures and functions of the inserting unit 1901 and the transmitting unit 1902 being identical to those of Embodiment 1, and being not going to be described herein any further, the digital-to-analog converting unit 1903 performs digital-to-analog conversion on the digital signal, and the optical modulator unit 1904 modulates light by taking the signals converted by the digital-to-analog converting unit 1903 as modulation signals.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Embodiment 4

Figure 20:
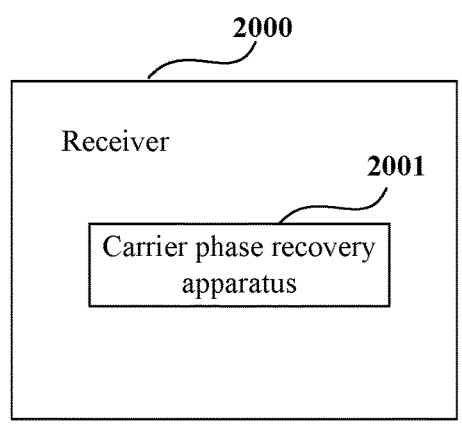
FIG. 20 is a schematic diagram of the receiver of Embodiment 4 of this disclosure.

An embodiment of this disclosure further provides a receiver. FIG. 20 is a schematic diagram of the receiver of Embodiment 4 of this disclosure. As shown in FIG. 20, the receiver 2000 includes a carrier phase recovery apparatus 2001, a structure and functions of the carrier phase recovery apparatus 2001 being identical to those of Embodiment 2, and being not going to be described herein any further.

Figure 21:
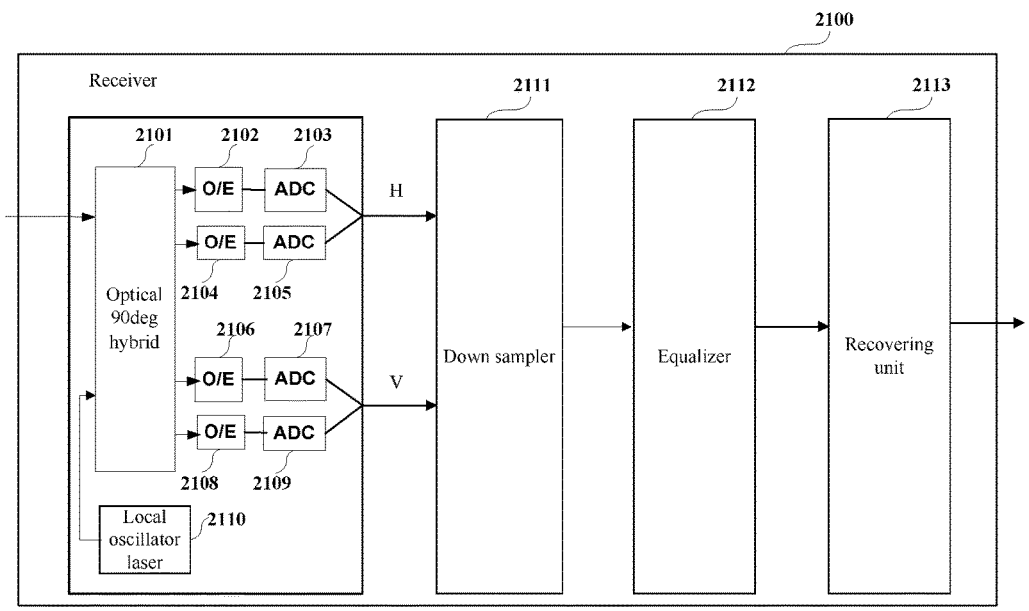
FIG. 21 is a block diagram of a systematic structure of the receiver of Embodiment 4 of this disclosure.

FIG. 21 is a block diagram of a systematic structure of the receiver of Embodiment 4 of this disclosure. As shown in FIG. 21, the receiver 2100 includes:

a front end configured to convert an inputted optical signal into baseband signals in two polarization states, in this embodiment, the two polarization states including an H polarization state and a V polarization state.

As shown in FIG. 21, the front end includes a local oscillator laser 2110, an optical 90 deg hybrid 2101, optoelectronic (O/E) detectors 2102, 2104, 2106 and 2108, analog-to-digital converters (ADCs) 2103, 2105, 2107 and 2109, a down sampler 2111, an equalizer 2112 and a recovering unit 2113. In this embodiment, the recovering unit 2113 may have a structure and functions identical to those of the carrier phase recovery apparatus described in Embodiment 2, and shall not be described herein any further; the local oscillator laser 2110 is configured to provide a local light source; an optical signal is converted into a baseband signal in the H polarization state after passing through the optical 90 deg hybrid 2101, the optoelectronic (O/E) detectors 2102 and 2104 and the analog-to-digital converters (ADCs) 2103 and 2105; and the optical signal is converted into a baseband signal in the V polarization state after passing through the optical 90 deg hybrid 2101, the optoelectronic (O/E) detectors 2106 and 2108 and the analog-to-digital converters (ADCs) 2107 and 2109, with a detailed process being similar to that in the related art, and being not going to be described herein any further.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Embodiment 5

Figure 22:
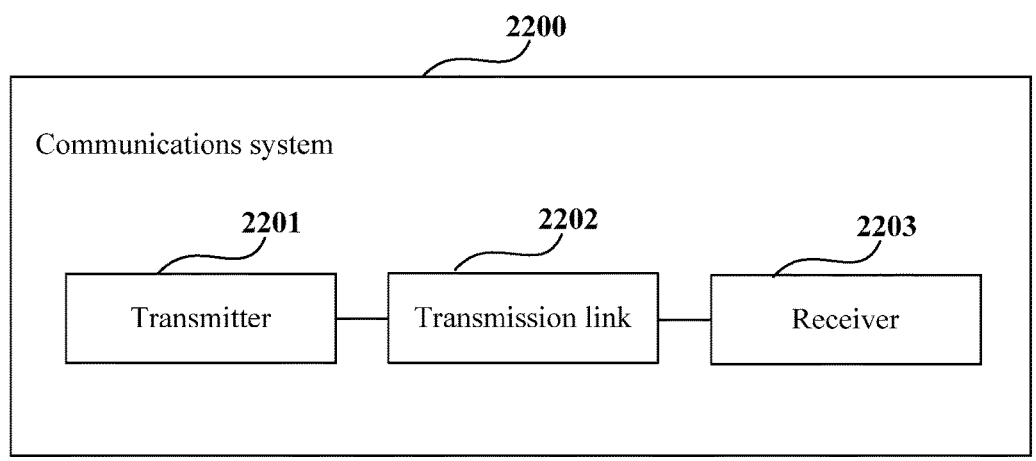
FIG. 22 is a schematic diagram of the communications system of Embodiment 5 of this disclosure.

An embodiment of this disclosure further provides a communications system. FIG. 22 is a schematic diagram of the communications system of Embodiment 5 of this disclosure. As shown in FIG. 22, the communications system 2200 includes a transmitter 2201, a transmission link 2202 and a receiver 2203. In this embodiment, a structure and functions of the transmitter 2201 are identical to those of Embodiment 3, and a structure and functions of the receiver 2203 are identical to those of Embodiment 4, which shall not be described herein any further; and the transmission link 2202 may have an existing structure and functions, which are not limited in the embodiment of this disclosure.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Embodiment 6

Figure 23:
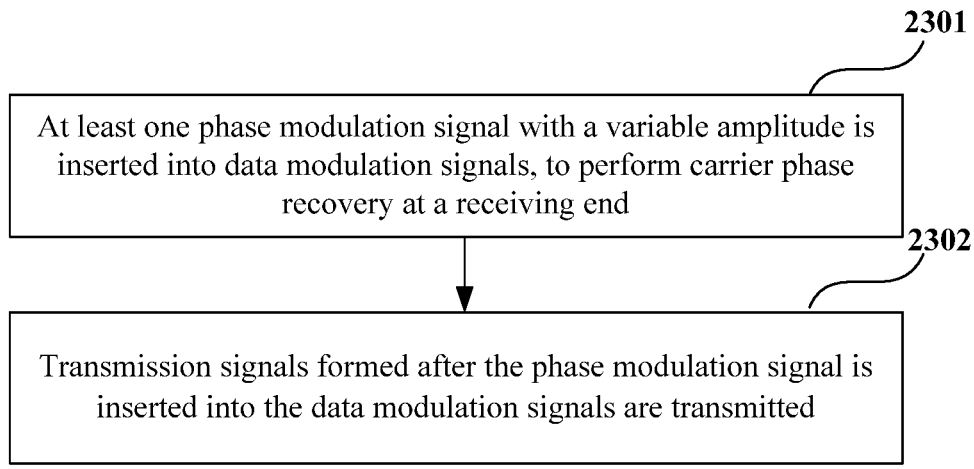
FIG. 23 is a flowchart of the signal transmission method of Embodiment 6 of this disclosure.

An embodiment of this disclosure further provides a signal transmission method, corresponding to the signal transmission apparatus of Embodiment 1. FIG. 23 is a flowchart of the signal transmission method of Embodiment 6 of this disclosure. As shown in FIG. 23, the method includes:

Step 2301: at least one phase modulation signal with at least one variable amplitude is inserted into data modulation signals, to perform carrier phase recovery at a receiving end; and Step 2302: transmission signals formed after the phase modulation signal is inserted into the data modulation signals are transmitted.

In this embodiment, a method of inserting the phase modulation signal and a method of the transmitting transmission signals are identical to those in Embodiment 1, and shall not be described herein any further.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

Embodiment 7

Figure 24:
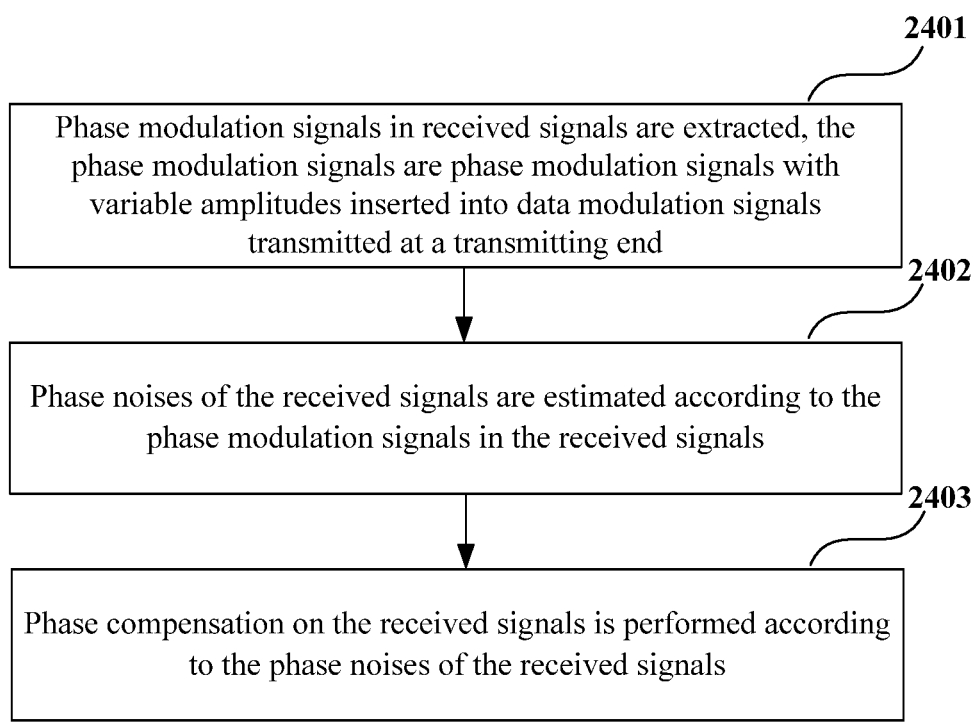
FIG. 24 is a flowchart of the carrier phase recovery method of Embodiment 7 of this disclosure.

An embodiment of this disclosure further provides a carrier phase recovery method, corresponding to the carrier phase recovery apparatus of Embodiment 2. FIG. 24 is a flowchart of the signal transmission method of Embodiment 7 of this disclosure. As shown in FIG. 24, the method includes:

Step 2401: phase modulation signals in received signals are extracted; the phase modulation signals are phase modulation signals with variable amplitudes inserted into data modulation signals transmitted at a transmitting end;

Step 2402: phase noises of the received signals are estimated according to the phase modulation signals in the received signals; and Step 2403: phase compensation on the received signals is performed according to the phase noises of the received signals.

In this embodiment, a method of extracting the phase modulation signals in the received signals, a method of estimating the phase noise of the received signals according to the phase modulation signals in the received signals and a method of performing phase compensation on the received signals are identical to those in Embodiment 2, and shall not be described herein any further.

It can be seen from the above embodiment that by inserting phase modulation signals with variable amplitudes into data modulation signals and performing carrier phase recovery on received signals at a receiving end according to the phase modulation signals, the apparatuses and methods are applicable to communications systems of various modulation formats and are compatible with existing communications systems, and calculation complexity is relatively low. Furthermore, as the amplitudes of the inserted phase modulation signals are variable, the phase modulation signals may be flexibly configured in data modulation signals, to lower redundancy and influence on the system capacity is relatively small.

An embodiment of the present disclosure provides a computer readable program code, which, when executed in a signal transmission apparatus or a transmitter, will cause a computer unit to carry out the signal transmission method as described in Embodiment 6 in the signal transmission apparatus or the transmitter.

An embodiment of the present disclosure provides a computer readable program code, which, when executed in a carrier phase recovery apparatus or a receiver, will cause a computer unit to carry out the carrier phase recovery method as described in Embodiment 7 in the carrier phase recovery apparatus or the receiver.

An embodiment of the present disclosure provides a computer readable medium, including a computer readable program code, which will cause a computer unit to carry out the signal transmission method as described in Embodiment 6 in a signal transmission apparatus or a transmitter.

An embodiment of the present disclosure provides a computer readable medium, including a computer readable program code, which will cause a computer unit to carry out the carrier phase recovery method as described in Embodiment 7 in a carrier phase recovery apparatus or a receiver.

The method/apparatus described with reference to the embodiments of the present disclosure may be directly embodied as hardware, a software module executed by a processor, or a combination thereof. For example, one or more of the block diagrams and/or one or more combinations of the block diagrams shown in FIGS. 1 and 14 may correspond to soft modules of a process of a computer program, and may also correspond to hardware modules. The soft modules may correspond to the steps shown in FIGS. 23 and 24, respectively, and the hardware modules, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 1 and 14 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. A signal transmission apparatus, including:

an inserting unit configured to insert at least one phase modulation signal with at least one variable amplitude into data modulation signals, to perform carrier phase recovery at a receiving end; and a transmitting unit configured to transmit transmission signals formed after the phase modulation signal is inserted into the data modulation signals.

Supplement 2. The apparatus according to supplement 1, wherein the phase modulation signals have multiple amplitudes or a single amplitude.

Supplement 3. The apparatus according to supplement 1, wherein the inserting unit is configured to insert at least two of the phase modulation signals into the data modulation signals; and wherein a phase difference between any two phase modulation signals in the at least two phase modulation signals is $$\frac{m\pi}{n};$$

where, m and n are non-zero integers.

Supplement 4. The apparatus according to supplement 1, wherein the constellation points of the phase modulation signals coincide with specific constellation points in a constellation diagram of the data modulation signals.

Supplement 5. The apparatus according to supplement 1, wherein the inserting unit is configured to insert the phase modulation signals into the data modulation signals in a consecutive or spaced manner in a time domain.

Supplement 6. The apparatus according to supplement 1, wherein a proportion of the phase modulation signals in the transmission signals is variable.

Supplement 7. The apparatus according to supplement 1, wherein the apparatus further includes:

a determining unit configured to determine positions of the phase modulation signals in the constellation diagram of the data modulation signals, so that a bit error rate of the receiving end is minimum when the phase modulation signals are at said positions.

Supplement 8. A carrier phase recovery apparatus, including:

an extracting unit configured to extract phase modulation signals in received signals; wherein, the phase modulation signals are phase modulation signals with variable amplitudes inserted into data modulation signals transmitted at a transmitting end;

an estimating unit configured to estimate phase noises of the received signals according to the phase modulation signals in the received signals; and a compensating unit configured to perform phase compensation on the received signals according to the phase noises of the received signals.

Supplement 9. The apparatus according to supplement 8, wherein the estimating unit includes:

a first estimating unit configured to estimate phase noises of the phase modulation signals; and an interpolating unit configured to perform interpolation processing on the phase noise of the phase modulation signals, to obtain the phase noise of the received signals.

Supplement 10. A transmitter, including the signal transmission apparatus as described in any one of supplements 1-7.

Supplement 11. A receiver, including the carrier phase recovery apparatus as described in supplement 8 or 9.

Supplement 12. A communications system, including the transmitter as described in supplement 10 and the receiver as described in supplement 11.

Supplement 13. A signal transmission method, including:

inserting at least one phase modulation signal with at least one variable amplitude into data modulation signals, to perform carrier phase recovery at a receiving end; and transmitting transmission signals formed after the phase modulation signal is inserted into the data modulation signals.

Supplement 14. The method according to supplement 13, wherein the phase modulation signals have multiple amplitudes or a single amplitude.

Supplement 15. The method according to supplement 13, wherein the inserting at least one phase modulation signal with at least one variable amplitude into data modulation signals includes:

inserting at least two of the phase modulation signals into the data modulation signals; and wherein a phase difference between any two phase modulation signals in the at least two phase modulation signals is $$\frac{m\pi}{n};$$

where, m and n are non-zero integers.

Supplement 16. The method according to supplement 13, wherein the constellation points of the phase modulation signals coincide with specific constellation points in a constellation diagram of the data modulation signals.

Supplement 17. The method according to supplement 13, wherein the inserting at least one phase modulation signal with at least one variable amplitude into data modulation signals includes:

inserting the phase modulation signals into the data modulation signals in a consecutive or spaced manner in a time domain.

Supplement 18. The method according to supplement 13, wherein a proportion of the phase modulation signals in the transmission signals is variable.

Supplement 19. The method according to supplement 13, wherein the method further includes:

determining positions of the phase modulation signals in the constellation diagram of the data modulation signals, so that a bit error rate of the receiving end is minimum when the phase modulation signals are at said positions.

Supplement 20. A carrier phase recovery method, including:

extracting phase modulation signals in received signals; wherein, the phase modulation signals are phase modulation signals with variable amplitudes inserted into data modulation signals transmitted at a transmitting end;

estimating phase noises of the received signals according to the phase modulation signals in the received signals; and performing phase compensation on the received signals according to the phase noises of the received signals.

Supplement 21. The method according to supplement 20, wherein the estimating phase noises of the received signals according to the phase modulation signals in the received signals includes:

estimating phase noises of the phase modulation signals; and performing interpolation processing on the phase noises of the phase modulation signals, to obtain the phase noises of the received signals.

The invention claimed is:

1. A signal transmission apparatus, comprising:
a memory that stores a plurality of instructions;
a processor that couples to the memory and causes the signal transmission apparatus to:
insert at least one phase modulation signal with at least one variable amplitude into data modulation signals, to perform carrier phase recovery at a receiving end, and
transmit transmission signals formed after the at least one phase modulation signal is inserted into the data modulation signals,
wherein the at least one phase modulation signal is among at least two of phase modulation signals inserted into the data modulation signal, wherein the at least two phase modulation signals have at least one of multiple amplitudes or a single amplitude, and wherein a phase difference between any two phase modulation signals in the at least phase modulation signals is $$\frac{m\pi}{n};$$

where, m and n are non-zero integers.

2. The signal transmission apparatus according to claim 1, wherein constellation points of the at least two phase modulation signals coincide with specific constellation points in a constellation diagram of the data modulation signals.

3. The signal transmission apparatus according to claim 1, wherein the processor causes the signal transmission apparatus to insert the at least two phase modulation signals into the data modulation signals in a consecutive or spaced manner in a time domain.

4. The signal transmission apparatus according to claim 1, wherein a proportion of the at least two phase modulation signals in the transmission signals is variable.

5. The signal transmission apparatus according to claim 1, wherein the processor further causes the apparatus to determine positions of the at least two phase modulation signals in the constellation diagram of the data modulation signals, so that a bit error rate of the receiving end is minimum when the at least two phase modulation signals are at said positions.

6. A transmitter, comprising the signal transmission apparatus as claimed in claim 1.

* * * * *